US012563547B2

(12) United States Patent
Monajemi et al.

(10) Patent No.: US 12,563,547 B2
(45) Date of Patent: Feb. 24, 2026

(54) AP CONTROLLED PEER-TO-PEER MULTI-LINK OPERATIONS SIGNALING

(71) Applicant: Cisco Technology, Inc., San Jose, CA (US)

(72) Inventors: Pooya Monajemi, San Jose, CA (US); Robert E. Barton, Richmond (CA); Juan Carlos Zuniga, Montreal (CA); Malcolm M. Smith, Richardson, TX (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 357 days.

(21) Appl. No.: 18/193,337

(22) Filed: Mar. 30, 2023

(65) Prior Publication Data

US 2024/0163866 A1     May 16, 2024

Related U.S. Application Data

(60) Provisional application No. 63/383,439, filed on Nov. 11, 2022.

(51) Int. Cl.
| *H04W 72/232* | (2023.01) |
| *H04W 72/1263* | (2023.01) |
| *H04W 72/23* | (2023.01) |

(52) U.S. Cl.
CPC ....... *H04W 72/1263* (2013.01); *H04W 72/23* (2023.01)

(58) Field of Classification Search
CPC ..... H04W 72/23; H04W 76/14; H04W 72/40; H04W 72/1263
See application file for complete search history.

(56) References Cited

U.S. PATENT DOCUMENTS

| 2018/0206139 A1* | 7/2018 | Wang ................... H04B 7/2606 |
| 2021/0007168 A1 | 1/2021 | Asterjadhi et al. |
| 2021/0112626 A1 | 4/2021 | Yi et al. |
| 2022/0078844 A1 | 3/2022 | Cherian et al. |

(Continued)

FOREIGN PATENT DOCUMENTS

WO       2021239618 A2    12/2021

OTHER PUBLICATIONS

S. Hwang et al., "P2P Communication with EMLSR Peer in Triggered TXOP Sharing," IEEE, Dated: Sep. 15, 2022, pp. 1-10.

(Continued)

*Primary Examiner* — Andrew Lee
(74) *Attorney, Agent, or Firm* — Patterson + Sheridan, LLP

(57)       ABSTRACT

Techniques for improved peer-to-peer communication are provided. A wireless access point (AP) may initiate peer-to-peer communication between multilink peer-to-peer devices by sending a trigger frame addressed to the peer-to-peer devices to hand over a transmission opportunity (TXOP). The trigger frame is sent based on the AP's knowledge of the availability of the peer-to-peer devices for peer-to-peer communication. The trigger frame indicates a link to be used for the peer-to-peer communication. In response to receiving the trigger frame one or more of the peer-to-peer devices acknowledge the trigger frame, tune to the assigned link, and use the remaining portion of the TXOP for peer-to-peer communication.

20 Claims, 6 Drawing Sheets

(56) References Cited

U.S. PATENT DOCUMENTS

| | | | | |
|---|---|---|---|---|
| 2022/0116165 A1 | | 4/2022 | Segev et al. | |
| 2022/0124684 A1 | | 4/2022 | Segev et al. | |
| 2022/0174732 A1 | * | 6/2022 | Xia | H04W 16/14 |
| 2022/0264652 A1 | * | 8/2022 | Viger | H04W 74/0833 |
| 2023/0117842 A1 | * | 4/2023 | Xin | H04W 28/0268 |
| | | | | 370/235 |
| 2024/0007846 A1 | * | 1/2024 | Kneckt | H04W 52/0258 |
| 2024/0007918 A1 | * | 1/2024 | Patil | H04W 36/08 |
| 2024/0064811 A1 | * | 2/2024 | Klein | H04B 7/04026 |
| 2024/0089791 A1 | * | 3/2024 | Huang | H04W 24/08 |
| 2024/0205903 A1 | * | 6/2024 | Yu | H04L 5/0094 |
| 2025/0112979 A1 | * | 4/2025 | Yang | H04L 69/14 |
| 2025/0159551 A1 | * | 5/2025 | Ahn | H04W 74/006 |

OTHER PUBLICATIONS

S. Hwang et al., "P2P Communication with EMLSR Peer in Triggered TXOP Sharing," IEEE P802.11: Wireless LANs, Dated: Nov. 14, 2022, pp. 1-3.
U.S. Appl. No. 18/052,057 entitled: Techniques for Reduced Signaling in Multilink Operations, filed on Nov. 2, 2022.

\* cited by examiner

AP CONTROLLED PEER-TO-PEER MULTI-LINK OPERATIONS SIGNALING

CROSS-REFERENCE TO RELATED APPLICATIONS

This application claims benefit of U.S. provisional patent application Ser. No. 63/383,439 filed Nov. 11, 2022. The aforementioned related patent application is herein incorporated by reference in its entirety.

TECHNICAL FIELD

Embodiments presented in this disclosure generally relate to peer-to-peer communications. More specifically, embodiments disclosed herein relate to peer-to-peer communications involving multi-link operations (MLO).

BACKGROUND

In some wireless local area network (WLAN) deployments, such as WiFi systems, peer-to-peer (P2P) or client-to-client (C2C) mechanisms can be used to enable direct communication between devices. This can more generally be viewed as a network allowing one or more other devices to directly communicate with each other without requiring uplink/downlink from the network (e.g., without transmitting data to or receiving data from a wireless access point (AP) that provides the WLAN connectivity). Peer-to-peer support generally involves an AP allocating time slots (e.g., TXOPs) and/or resource units (RUs) for peer-to-peer stations (STAs) to communicate.

Conventional approaches to peer-to-peer scheduling are generally inefficient and can result in failed peer-to-peer communication given that a peer STA may not know of the availability of a counterpart peer STA during a scheduled TXOP. In the case where one or more of the STAs are multi-link devices (MLDs), a peer STA may not know whether the counterpart peer STA's radio is available for peer-to-peer communication on an assigned link during the TXOP.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
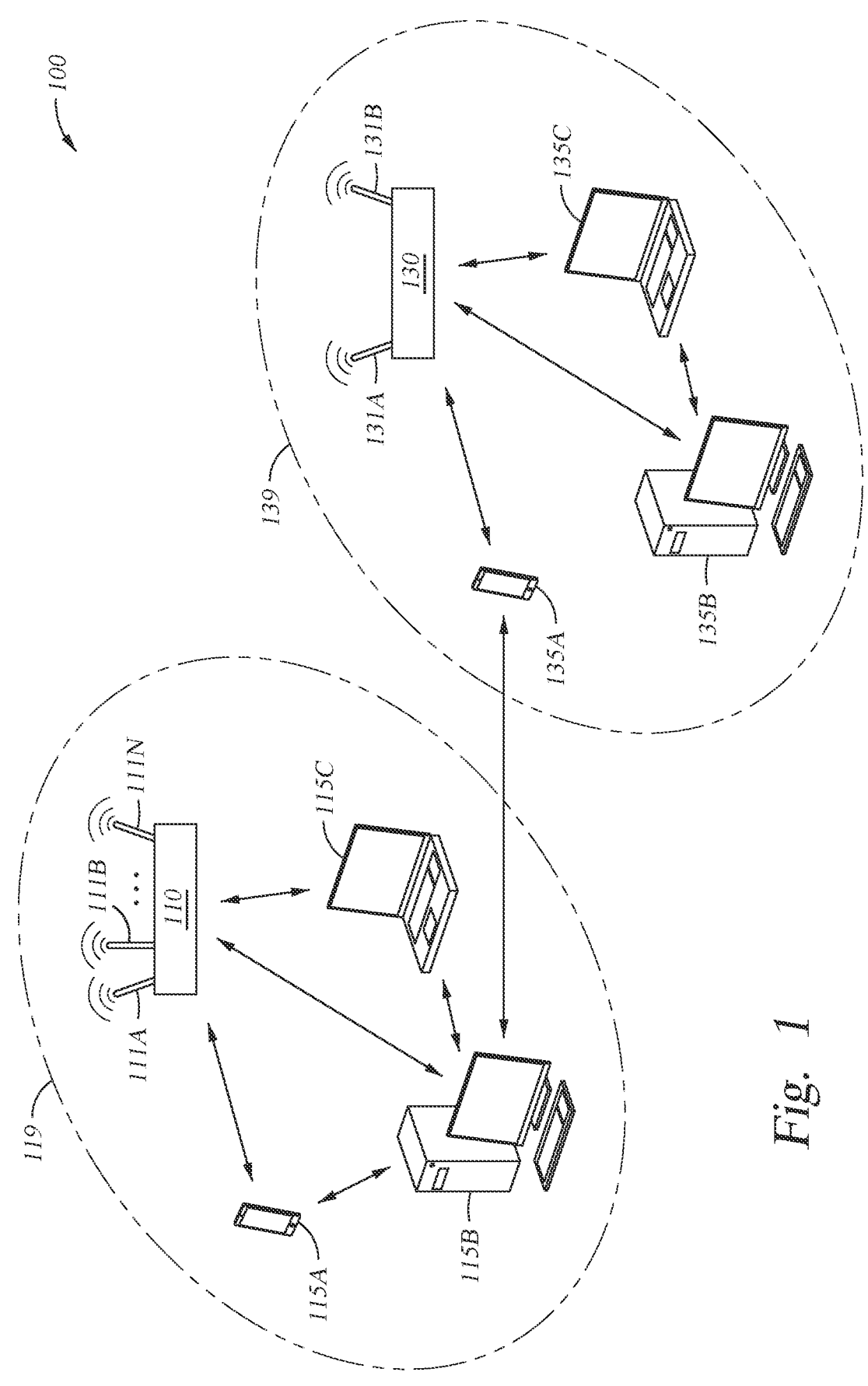
FIG. 1 depicts an example environment for peer-to-peer communication including MLD peer-to-peer devices, according to some embodiments of the present disclosure.

One embodiment presented in this disclosure provides a method, including scheduling, by a wireless access point (AP), a peer-to-peer communication opportunity between a first multilink peer-to-peer device and a second multilink peer-to-peer device; and transmitting, by the wireless AP, a first trigger frame to the first peer-to-peer device and the second peer-to-peer device based on the scheduling, wherein the trigger frame indicates a link for the peer-to-peer communication opportunity and a beginning of the peer-to-peer communication opportunity, at least one of the first peer-to-peer device or the second peer-to-peer device transmit a confirmation frame to the wireless AP in response to the first trigger frame, and the first peer-to-peer device transmits one or more data packets to the second peer-to-peer device in response to the first trigger frame.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

Example Embodiments

Embodiments of the present disclosure provide methods, systems, and techniques for improved peer-to-peer communications involving MLD peer-to-peer devices.

In some embodiments, an AP may trigger peer-to-peer communication (which was requested by one or more peer-to-peer devices) by sending a transfer or trigger frame addressed to the peer-to-peer devices (or broadcast) to hand over a TXOP to the peer-to-peer devices for the peer-to-peer communication. In one embodiment, the AP may initiate the trigger frame based on the AP's knowledge of the availability of the peer-to-peer devices for the peer-to-peer communication. For example, in one embodiment, the AP may determine whether the peer-to-peer devices are (or will be) engaged in other conflicting peer-to-peer communication. In some embodiments, the AP may determine whether the peer-to-peer devices are (or will be) engaged in uplink or downlink communication with the AP (or with another AP). In one embodiment, the AP may communicate with one or more other APs that may also be scheduling the peer-to-peer devices for communication. In some embodiments, the AP may determine whether a radio of one or more of the MLD peer-to-peer devices is available to support the peer-to-peer communication. In one embodiment, the trigger frame may assign subchannels or RUs to the peer-to-peer devices for communication with the AP and/or for the peer-to-peer communication.

Upon receiving the trigger frame, in one embodiment, one or more of the peer-to-peer devices may send an acknowledgement to the AP. In some embodiments, one or more of the peer-to-peer devices may be configured to detect an acknowledgement sent by another one or more of the peer-to-peer devices. Thereafter, the peer-to-peer devices may utilize the remaining portion of the TXOP for the peer-to-peer communication. In one embodiment, each peer-to-peer device may be configured to send an acknowledgement in response to receiving peer-to-peer data. The peer-to-peer devices may be configured to select data length such that there is sufficient time for a recipient of the peer-to-peer data to send an acknowledgement of receipt prior to the end of the TXOP.

In one embodiment, if one or all of the peer-to-peer devices do not acknowledge receipt of the trigger frame from the AP, the AP may terminate or cancel the TXOP or allocation. In some embodiments, the AP may be configured to acknowledge receipt of the one or more acknowledgements of receipt of the trigger frame from the peer-to-peer devices prior to commencement of the peer-to-peer communication.

FIG. 1 depicts an example environment 100 for peer-to-peer communication scheduling involving MLD peer-to-peer devices, according to some embodiments of the present disclosure.

In the illustrated example, a plurality of wireless APs, e.g., the APs 110 and 130, are each communicatively coupled with corresponding sets of associated wireless client devices. For example, wireless client devices 115A-C are associated with AP 110, and wireless client devices 135A-C are associated with AP 130. "Association" with an AP, as used herein, generally means that the wireless client device has been authenticated and/or authorized by the AP, and configured with network settings that allow the wireless client device to connect to a wireless network via that AP. Wireless client devices typically associate with an AP when they are within the "cell", or coverage area, of the AP within which a sufficiently strong wireless connection can be maintained with the AP. FIG. 1 illustrates examples of cells 119 and 139 for APs 110 and 130, respectively. As a wireless client device moves towards the edge of a cell, the wireless signal between the AP and the wireless client device may weaken, thereby prompting or leading to connection with a different AP with a stronger (perceived) wireless signal.

The wireless APs 110 and 130 are generally representative of an infrastructure network, such as a WLAN. Though two APs are depicted for conceptual clarity, in other embodiments, there may be any number of APs. While not shown in FIG. 1, the APs 110 and 130 may be communicably connected to each other in one or more ways, e.g., via Ethernet, a mesh or wireless network, or the like, thereby allowing for connectivity between wireless client devices associated with different APs.

Generally, the AP(s) are used to provide wireless communication via the WLAN. For example, each AP may receive traffic requests from associated devices (e.g., indicating the amount of data to be transmitted, the priority of the flow, and the like). The AP may then allocate available network resources to associated devices, such as by scheduling transmissions into defined timeslots and/or portions of the spectrum. For example, within each transmission opportunity (TXOP), the AP may assign RU(s) or physical layer protocol data units (PPDUs) to one or more connected devices, where each connected device uses the scheduled resources to transmit data to the associated AP (or to receive data from the associated AP).

The scheduled transmissions managed by the AP generally include uplink transmissions (e.g., data transmitted from one or more connected devices to the AP) and downlink transmissions (e.g., data transmitted from the AP to one or more associated devices). In some embodiments, the AP may also manage peer-to-peer transmissions between the wireless client devices. As an example, FIG. 1 illustrates peer-to-peer communications between wireless client devices 115A and 1158, wireless client devices 1158 and 115C, between wireless client devices 135C and 1358, and between wireless client devices 1158 and 135A.

In some embodiments, each AP can schedule the peer-to-peer transmissions by assigning a spectrum or channel, or a portion of the allocated spectrum or channel(s) (e.g., one or more subcarriers, such as an RU) during a defined window of time (e.g., a TXOP) to devices. That is, for each TXOP, the AP may assign the available RU(s) to one or more peer-to-peer devices, allowing each peer-to-peer device to use the assigned wireless resources, during the TXOP, to transmit data to another peer-to-peer device. For example, AP 110 may schedule RUs during TXOPs for peer-to-peer communications between wireless client devices 115A and 1158, between wireless client devices 1158 and 115C, and for wireless client device 1158 to communicate with unassociated wireless client device 135A. Similarly, AP 130 may schedule RUs during TXOPs for peer-to-peer communications between wireless client devices 135A and 135B, and for wireless client device 135A to communicate with unassociated wireless client device 115B.

With an ever-growing number of devices using wireless networks for a variety of applications, including for large data transmissions involving, as an example, video and voice, it is becoming increasingly important for wireless systems to support not only efficient data throughput, but also to serve the concurrent demands of multiple devices. In one embodiment of the present disclosure, one or more of the APs and wireless client devices may be multilink devices (MLDs) capable of multilink operations (MLO). MLDs generally include two or more links, wherein each link is associated with a frequency band. Examples of frequency bands include the 2.4 gigahertz (GHz) band, the 5 GHz band, and the 6 GHz band that are used in networks implementing IEEE's 802.11 standards. The term "link" and "band" are used interchangeably in this disclosure.

A MLD is generally capable of utilizing multiple links for communication with other devices. In some embodiments, the MLDs may be equipped with multiple radios and capable of using two or more of the available links simultaneously for communicating with other devices, thereby improving network throughput and providing greater connectivity with multiple devices. In some embodiments, the number of radios included in the MLD may be different than the number of links that the MLD can utilize for communication. For example, in some embodiments, the number of radios in the MLD may be less than the number of links that the MLD can utilize for communication. In one embodiment, the MLD may include a single radio and two or more links for communication with other devices. Such MLDs with a single radio and two or more links are referred to herein as multi-link single radio (MLSR) MLDs or enhanced MLSR (EMLSR) MLDs.

In some embodiments of the present disclosure, the APs may be capable of simultaneously operating multiple radios to support multiple links (e.g., the APs may themselves be MLDs). For example, the AP 110 is shown having multiple links 111A, 111B . . . 111N, and AP 130 is shown having links 131A and 131B. In one embodiment, each of the multiple links of the APs 110 and 130 may include dedicated radios to simultaneously transmit and receive data on respective links. In some embodiments, and the wireless client devices may have fewer number of radios in comparison to the number of links that support communication with other devices.

In one embodiment, the wireless peer-to-peer client devices 115A and 115B may be EMLSR MLDs capable of communicating on multiple links, but may have a single radio to operate those links. Accordingly, the single radio may be shared to operate the multiple links using a multiplexing scheme, e.g., a time-division multiplexing scheme to switch that radio from one link to another link.

In one embodiment of the present disclosure, EMLSR MLDs may be capable of receiving simple instructions and/or messages simultaneously on two or more of the EMLSR device's multiple links, but may only be able to receive or transfer more substantive data on the link on which the EMLSR device's radio is active. While embodiments of this disclosure describe operation of single radio, or EMLSR, devices, it is to be understood that the concepts described herein can be adapted to operate any device where the number of radios available are less than the number of links that the device can use for communication.

In some embodiments of the present disclosure, the APs and wireless client devices may implement multiuser technologies, e.g., orthogonal frequency-division multiple access (OFDMA) and multiuser multi-input, multi output (MU-MIMO). Using OFDMA and MU-MIMO may allow APs to communicate with multiple wireless client devices simultaneously on a single link, thereby further improving throughput and improving the network's capability to support multiple devices. For example, in some embodiments, one or more of the links/bands 111A, 111B . . . 111N, 131A, and 131B may be equipped with multiple antennas to support MU-MIMO communication.

Figure 2:
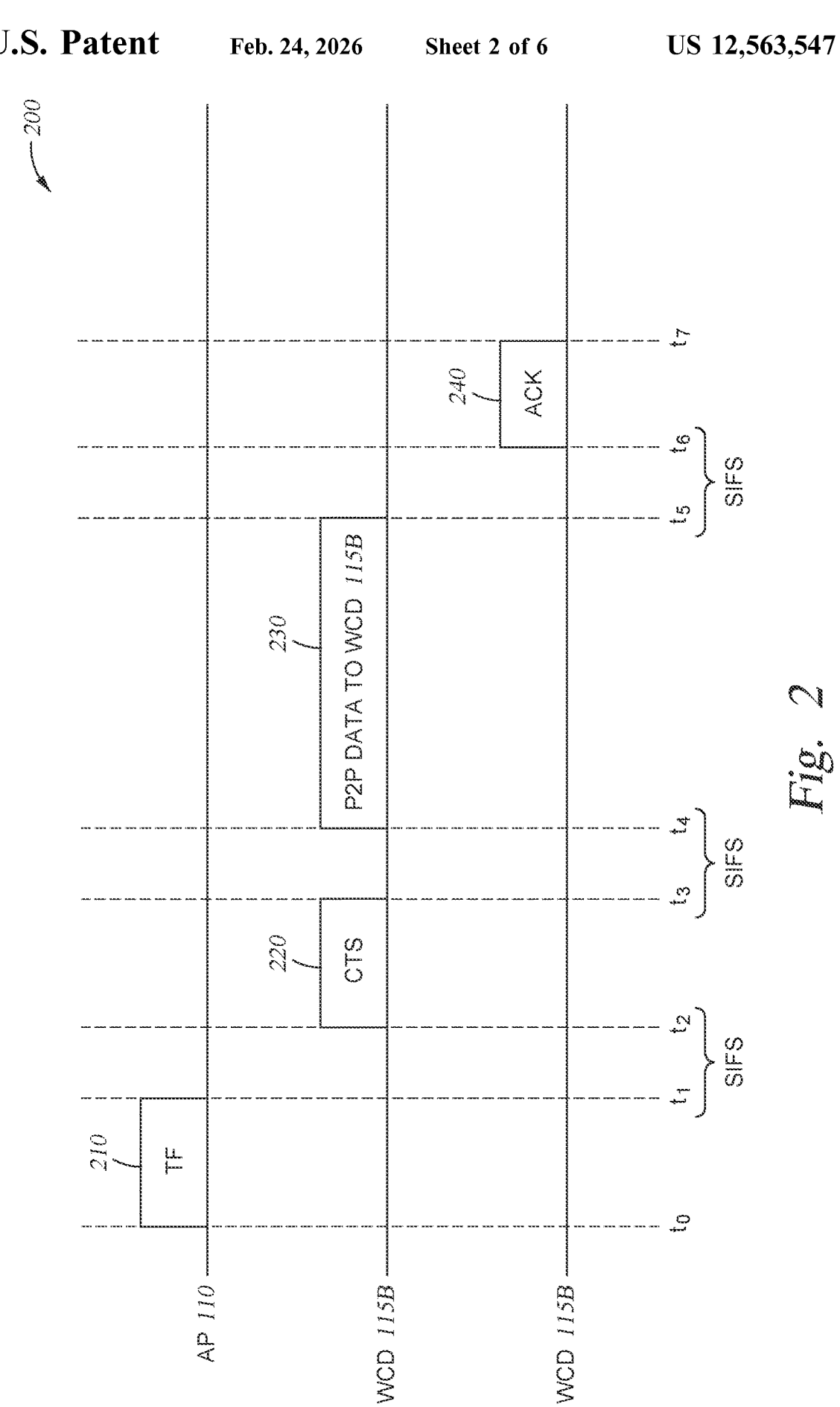
FIG. 2 depicts an example of a frame exchange between an AP and peer-to-peer devices during peer-to-peer communication, according to some embodiments of the present disclosure.

FIG. 2 depicts an example of a frame exchange 200 among an AP and two wireless peer-to-peer client devices, according to embodiments of the present disclosure. For purposes of illustration, the frame exchange 200 is depicted as exchanges between the AP 110, wireless client device 115A, and wireless client device 115B of FIG. 1 in order to facilitate the peer-to-peer communication between wireless client devices 115A and 115B. For the purposes of the frame exchange 200, in one embodiment, the AP 110 is a MLD with multiple radios, and therefore capable of simultaneous data communication on multiple links by means of the multiple radios. In one embodiment, the wireless client devices 115A and 115B may be EMLSR MLDs during the frame exchange 200.

As shown in FIG. 200, the frame exchange may begin with a transfer or trigger frame 210 from AP 110 sent between t0 and t1. In one embodiment of the present disclosure, the trigger frame 210 may be addressed to wireless client devices 115A and 115B (e.g., it may be a MU trigger frame). In some embodiments, the trigger frame 210 is a broadcast frame that in some way identifies the wireless client devices 115A and 115B (e.g., by specifying their association IDs, their MAC addresses, and the like). In one embodiment, the AP 110 may initiate the peer-to-peer transfer between wireless client devices 115A and 115B based on determining that wireless client device 115A desires to send peer-to-peer data to wireless client device 115B. Such determination may be made, for example, upon receiving a buffer status report (BSR) from wireless client device 115A indicating that wireless client device 115A has peer-to-peer data for wireless client device 115B in wireless client device 115A's buffer.

In one embodiment, the AP 110 may initiate the peer-to-peer transfer between wireless client devices 115A and 115B based the AP 110's knowledge of the availability of wireless client device 115B to receive peer-to-peer data from wireless client device 115A. For example, AP 110 may manage the communications with, and in between, the wireless client devices 115A-C, as shown in FIG. 1. As previously discussed, managing communications may involve assigning RUs, TXOPs etc. to associated wireless client devices. Accordingly, AP 110 may, in one embodiment, determine availability of a wireless client device to receive peer-to-peer data based on its knowledge of the communication traffic with and among the wireless client devices associated with AP 110.

The AP 110 may use one or more factors to determine availability of a wireless client device 115B for peer-to-peer communication with wireless client device 115A. For example, the AP may determine whether the wireless client device 115B is engaged in peer-to-peer communication with a device other than wireless client device 115A. For example, referring back to FIG. 1, wireless client device 1158 is shown engaged in peer-to-peer communication with wireless client device 115C. Accordingly, at a given time, should wireless client device 1158 be occupied in peer-to-peer communication with wireless client device 115C (e.g., using one or more RUs assigned, by the AP 110, to the wireless client device 1158 and/or to the wireless client device 115C), the AP 110 may wait for such peer-to-peer communication between wireless client device 1158 and wireless client device 115C to complete before sending the trigger frame 210, according to one embodiment.

In one embodiment of the present disclosure that AP 110 may determine whether the AP 110 itself is engaged in uplink or downlink communications with wireless client device 115B in order to determine the availability of wireless client device 115B to engage in peer-to-peer communication with wireless client device 115A. Accordingly, at any given time, should wireless client device 1158 be engaged in uplink and/or downlink communication with the AP 110, the AP 110 may wait for such uplink and/or downlink communication between wireless client device 1158 and AP 110 to complete before sending the trigger frame 210, according to one embodiment.

In one embodiment of the present disclosure, the AP 110 may determine whether the wireless client device 115B is engaged in peer-to-peer communication managed by another AP. For example, in FIG. 1, wireless client device 1158 is shown engaged in peer-to-peer communication with wireless client device 135A. The peer-to-peer communications between wireless client device 135A and wireless client device 115B may, in one embodiment, be managed by AP 130 (either independently from the AP 110, or jointly with the AP 110). In some embodiments, the AP 110 may be communicably coupled, directly or indirectly, with the AP 130. Accordingly, in some embodiments, the AP 110 may communicate with AP 130, retrieve information related to AP 130's management of communications involving wireless client device 115B, and determine the availability of wireless client device 115B to engage in peer-to-peer communications with wireless client device 115A based on the retrieved information.

In one embodiment of the present disclosure where the wireless client device 115B is an EMLSR MLD, the AP 110 may determine whether a radio of the wireless client device 115B is available for the peer-to-peer communications with wireless client device 115A. Should the radio of the wireless client device 115B be engaged in communication with another device on one of the links of wireless client device 115B, the AP 110 may wait until the completion of such communication with the other device to initiate the trigger frame 210.

By ensuring that a wireless client device is available for peer-to-peer communication by considering one or more factors, such as the factors described hereinabove, embodiments of the disclosure significantly reduce the likelihood of a failure in the peer-to-peer communication between wireless client devices. While determining the availability of wireless client device 115B is described hereinabove, in some embodiments, the AP may also determine the availability of wireless client device 115A using, for example, the one or more of the described factors, prior to initiating the trigger frame 210.

In one embodiment the present disclosure the trigger frame 210 may be a handover trigger frame configured to hand over a TXOP to a wireless client device for peer-to-peer communication or to otherwise indicate, to the wireless client device(s), that they can or should use the TXOP for communication. For example, the time period between t0 and t7 may represent a TXOP available to AP 110. By issuing the trigger frame 210 for wireless client devices 115A and 115B, the AP 110 may hand over the TXOP between t0 and t7 to one, or both, of the wireless client devices 115A and 115B for peer-to-peer communication. In one embodiment, the trigger frame 210 may be a frame reserved solely for peer-to-peer communications, i.e., the trigger frame 210 may not include items related to uplink and/or downlink operations for communications with the AP 110. In some embodiments, the trigger frame 210 may be generically used to trigger communications (including uplink and downlink) to or from associated devices. For example, in one embodiment, the trigger frame 210 may include a flag or bit to indicate whether the allocated resources should be used for peer-to-peer communication or for uplink/downlink.

In one embodiment, the trigger frame 210 may be a simple frame that EMLSR MLD wireless client devices can receive on any or all of the wireless client device's links regardless of whether a radio is active on the link. Accordingly, in some embodiments, the wireless client devices may be configured to receive the trigger frame 210 on a link where the radio is not active (e.g., even if the radio is active/associated with another link at the time). In some embodiments, the wireless client devices may be able to detect the trigger frame even while the radio is actively communicating on a different link of the wireless client device.

In one embodiment, the trigger frame 210 may indicate to MLD wireless client devices a particular one of the links of the MLD on which the peer-to-peer data is to be exchanged. For example, the trigger frame 210 may be sent on the channel/link that will be used for peer-to-peer communications, thereby informing the receiving devices as to which link will be used. Accordingly, in some embodiments, in response to receiving the trigger frame 210, the MLD wireless client device may prepare to receive peer-to-peer data, for example, by switching a radio of the MLD wireless client device to the indicated link.

In some embodiments of the present disclosure, in response to receiving the trigger frame 210, one or more the peer-to-peer wireless client devices may respond with a clear-to-send (CTS) frame. In one embodiment, the CTS frame may be sent by a wireless client device that desires to send the peer-to-peer data. For example, referring the FIG. 2, a CTS frame 220 is sent by wireless client device 115A between t2 and t3 after a short interframe space (SIFS) between t1 and t2. The SIFS may be a predefined amount of time (e.g., defined by a wireless standard) that specifies a minimum amount of time that must pass between frames in the wireless network to avoid collision between the frames.

The CTS frame 220 may be sent by the wireless client device 115A to acknowledge receipt of the trigger frame 210 and accept handover of the TXOP to the wireless client devices 115A and 1158 for peer-to-peer communications. In one embodiment, if a CTS frame is not sent (or is not received by the AP 110), the AP 110 may terminate the TXOP. While wireless client device 115A is shown sending the CTS frame 220 in FIG. 2, in alternative embodiments, the CTS frame 220 may be sent by wireless client device 1158, or by both of the wireless client devices 115A and 1158.

As shown in FIG. 2, at t4, the wireless client device 115A may send peer-to-peer data frame 230 to wireless client device 1158 after a SIFS between t3 and t4. In one embodiment, the wireless client devices 115A and/or wireless client device 1158 may prepare for the peer-to-peer communication during the SIFS between t3 and t4 (or in the time between t1 and t4) by, for example, switching a radio to a link on which the peer-to-peer communication will happen. As further shown in FIG. 2, the wireless client device 1158 may send an acknowledgement frame 240 at t6, after a SIFS between t5 and t6, to acknowledge receipt of the peer-to-peer data frame 230. In one embodiment, the wireless client device 115A may determine the length of the peer-to-peer data frame 230 (referred to in some aspects as a PPDU) such that there is sufficient time in the TXOP to receive the acknowledgement frame 240.

According to some embodiments of the present disclosure, an AP may be configured to support peer-to-peer communications between a wireless client device that is associated with the AP and a wireless client device that is not associated with the AP. For example, the AP 110 may support peer-to-peer communications between the wireless client device 1158 associated with the AP 110 and the wireless client device 135A that is associated with AP 130 (or with a wireless client device that is not associated with any AP). In some such embodiments, prior to any peer-to-peer communications, wireless client device 1158 may indicate to AP 110 that it desires to communicate with a wireless client device 135A that is not associated to the AP 110 (and therefore does not have an assigned association identifier (AID) for the AP 110). Accordingly, in some embodiments, the AP 110 may assign a temporary peer-to-peer AID to wireless client device 135A (e.g., a temporary AID to be used to schedule peer-to-peer communications). The wireless client device 115B or the AP 110 may communicate or forward the temporary AID to wireless client device 135A. Therefore, in some embodiments, the AP 110 may be able to address the unassociated wireless client when it sends a trigger frame (e.g., the trigger frame 210) using the temporary AID. Furthermore, the unassociated wireless client device may be able to recognize the trigger frame sent by the AP 110 and prepare for peer-to-peer wireless communication by, for example, switching a radio to a link on which the peer-to-peer communication is expected.

Figure 3:
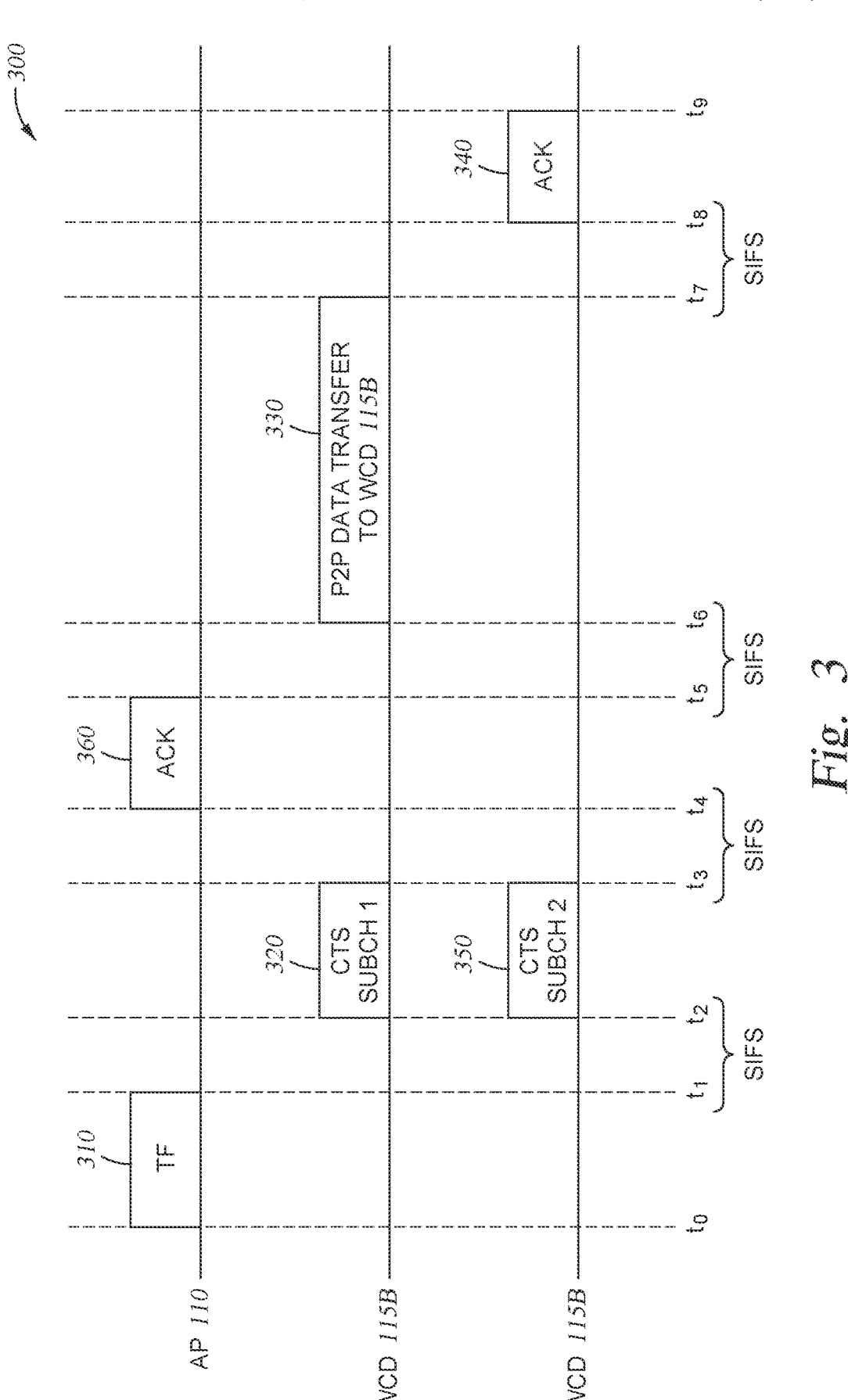
FIG. 3 depicts another example of a frame exchange between an AP and peer-to-peer devices during peer-to-peer communication, according to some embodiments of the present disclosure.

In some embodiments of the present disclosure, an AP may assign RUs or subchannels of a link in a handover trigger frame configured to initiate peer-to-peer communication. FIG. 3 depicts an example of a frame exchange where an AP, e.g. the AP 110, assigns RUs or subchannels to peer-to-peer devices, e.g. the wireless client devices 115A and 115B, for peer-to-peer communication. The AP 110 may initiate the peer-to-peer communications by issuing a trigger frame 310 to hand over a TXOP spanning from p0 to p9 to the peer-to-peer wireless client devices 115A and 115B. In one embodiment, the trigger frame may indicate the RU and/or subchannel on which peer-to-peer communication and/or communication with the AP is to take place. In one embodiment, the AP 110 may determine the availability of the peer-to-peer wireless client devices 115A and 115B based on, for example, one or more of the factors described hereinabove, prior to sending the trigger frame 310.

In one embodiment of the present disclosure, after a SIFS from p1 to p2, each of wireless client devices 115A and 115B may respond with respective CTS frames. For example, wireless client device 115A may respond with CTS frame 320 on a first subchannel (depicted as SubCh 1 in FIG. 3) and wireless client device 115B may respond with CTS frame 350 on a second subchannel (depicted as SubCh 2 in FIG. 3) between p2 and p3. In one embodiment, the first and second subchannel may be defined or specified in the trigger frame 310.

In one embodiment, the first subchannel and the second subchannel may be a part of the same link and AP 110 may utilize MU-MIMO techniques to receive the CTS frame 320 and CTS frame 350. In alternative embodiments, the first subchannel and the second subchannel may be on different links, and the AP 110 may receive CTS frame 320 and CTS frame 350 on different links or subchannels of different links.

Receiving a CTS from both peer-to-peer wireless client devices 115A and 115B may ensure that both of the peer-to-peer wireless client devices have received and acknowledged the RU or subchannel allocation for the peer-to-peer communication. In one embodiment, should any one of the CTS frames 320 or 350 not be received, the AP 110 may terminate the TXOP.

In one embodiment, the AP 110 may send, after the SIFS from p3 to p4, an acknowledgment 360 to one or both of wireless client devices 115A and 115B to confirm that the CTS frames 320 and 350 have been received and peer-to-peer communications can proceed. Thereafter, after a SIFS from p5 to p6, wireless client device 115A may transmit the peer-to-peer data 330 on the assigned RU or subchannel. Wireless client device 115B may then acknowledge receipt of the peer-to-peer data 330 after the SIFS from p7 to p8.

In some embodiments, the acknowledgement 360 from the AP 110 may be avoided and the wireless client device 115A may proceed with peer-to-peer data transmission after the SIFS ending at p4. In one embodiment, the wireless client device 115A may be configured to detect the CTS frame 350, thereby allowing wireless client device 115A to directly confirm wireless client device 115B's availability for peer-to-peer communication of the assigned RU or subchannel. For example, in some embodiments, wireless client device 115A may be configured to detect energy on the second subchannel and determine whether wireless client device 115B has sent the CTS frame 350 (e.g., if the wireless client device 115A detects energy on the second subchannel after the trigger frame 310, the wireless client device 115A may infer that the wireless client device 115B transmitted a CTS frame 350).

While FIGS. 2 and 3 show a single transfer of data from wireless client device 115A to wireless client device 115B, in alternative embodiments the peer-to-peer communication may involve both wireless client devices sending data. In some embodiments, each recipient of data may acknowledge receipt of data prior to the next communication exchange. In one embodiment, one of the peer-to-peer devices may take on the role of an AP during the TXOP for the purposes of managing the peer-to-peer communication, and assign resources within the TXOP for exchange of data between the peer-to-peer devices.

Figure 4:
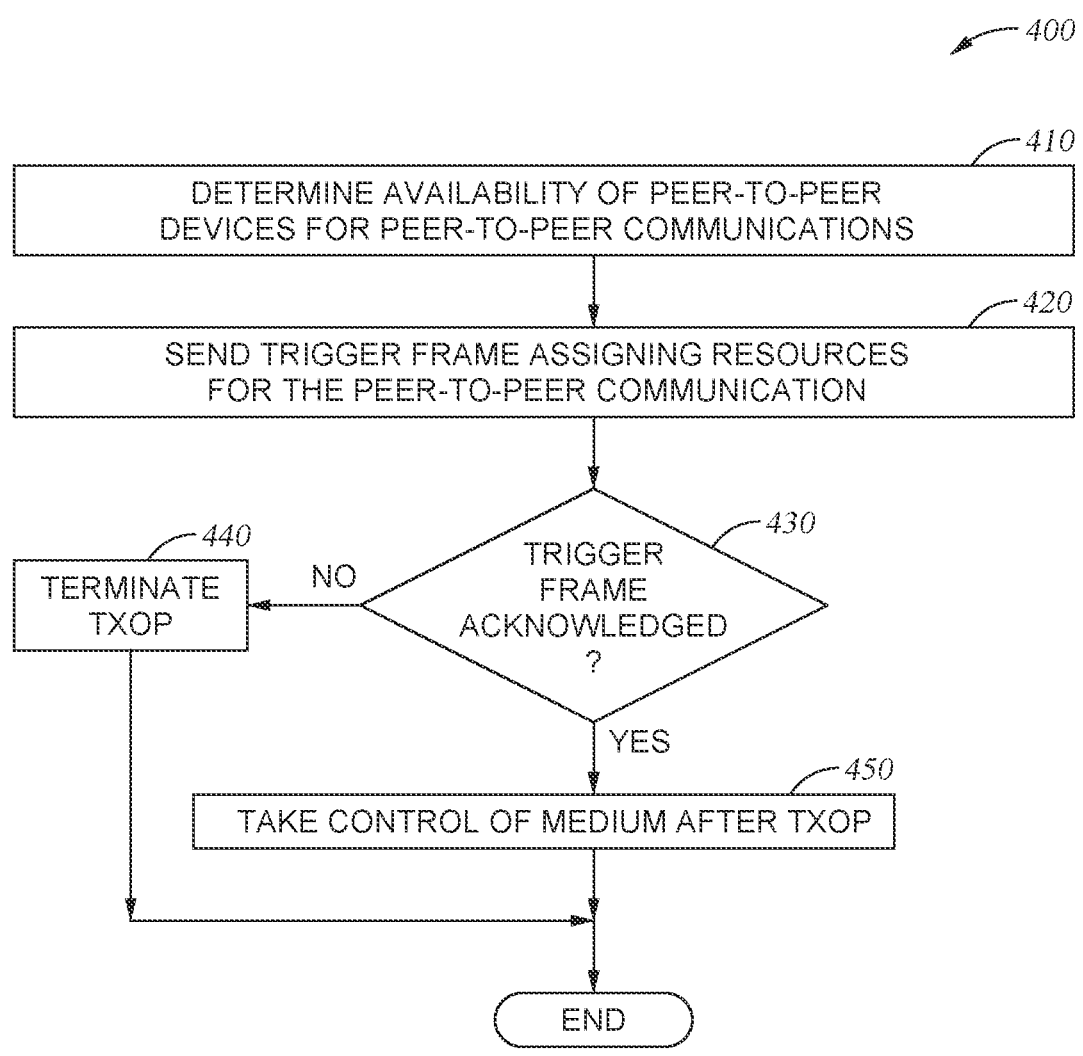
FIG. 4 is a flow diagram depicting an example of a method used by an AP to initiate peer-to-peer communication, according to some embodiments of the present disclosure.

FIG. 4 is a flow diagram of an example method 400 performed by an AP to facilitate peer-to-peer communications during a TXOP, according to some embodiments of the present disclosure. In some embodiments, the peer-to-peer devices may be MLDs where the number of radios available for communication is less than the number of links on which the peer-to-peer devices can communicate. In one embodiment, the peer-to-peer devices may be EMLSR MLDs. At block 410, the AP may determine the availability of the peer-to-peer devices to engage in peer-to-peer communication. The AP may make such determination based on, for example, the availability factors described hereinabove.

At block 420, the AP may send a trigger frame to hand over a TXOP to the peer-to-peer devices, wherein the trigger frames assigns a resource (e.g., link, subchannel, RU or the like) for the peer-to-peer communications. At block 430, the AP may determine whether receipt of the trigger frame is acknowledged (for example, with a CTS frame from at least one peer-to-peer device). If the trigger frame is not acknowledged, then in block 440, the AP may terminate the TXOP. If the trigger frame is acknowledged, then in block 450, the AP may let the TXOP continue and take control of the medium after the TXOP is completed.

Figure 5:
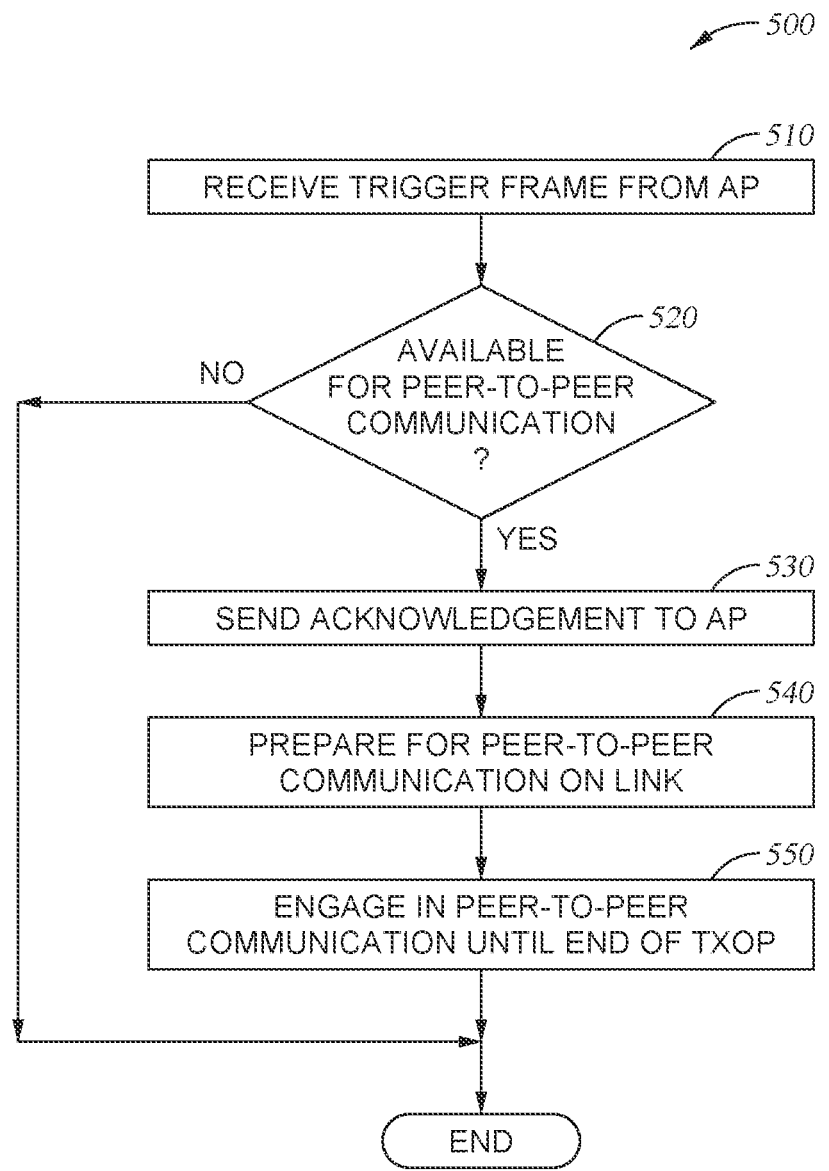
FIG. 5 is a flow diagram depicting an example of a method used by peer-to-peer devices during peer-to-peer communication, according to some embodiments of the present disclosure.

FIG. 5 is a flow diagram of an example method 500 performed by a peer-to-peer device during peer-to-peer communications, according to some embodiments of the present disclosure. In some embodiments, the peer-to-peer devices may be MLDs where the number of radios available for communication is less than a number of links on which the peer-to-peer devices can communicate. In one embodiment, the peer-to-peer devices may be EMLSRs. At block 510, the peer-to-peer device may receive a trigger frame from an AP to hand over a TXOP for peer-to-peer communication, wherein the trigger frame assigns resources for the peer-to-peer communication.

At block 520, the peer-to-peer device may determine whether it is available to engage in peer-to-peer communications. Determining whether the peer-to-peer device is available may involve, in one embodiment, determining whether a radio is available to send or receive peer-to-peer data on the resource by the AP. If the peer-to-peer device is not available for peer-to-peer communication, the method ends. If the peer-to-peer device is available for peer-to-peer communication, then, in one embodiment, the peer-to-peer device may send an acknowledgement of receipt of the trigger frame to the AP. In one embodiment, the acknowledgement may be a CTS frame.

At block 540, the peer-to-peer device may prepare for the peer-to-peer communication. For example, in one embodiment, the peer-to-peer device may switch a radio of the peer-to-peer device to the resource assigned by the AP trigger frame for peer-to-peer communication. In one embodiment, the step described in block 540 may be performed during a SIFS period.

At block 550, the peer-to-peer device may engage in peer-to-peer communication until the end of the TXOP.

Peer-to-peer communication may include sending and/or receiving peer-to-peer data. In one embodiment, the peer-to-peer device may be configured to send an acknowledgement of receipt of peer-to-peer data. In some embodiments, the peer-to-peer device may select a length of data transfer such that there is sufficient time to receive an acknowledgement from the recipient of the peer-to-peer data prior to the end of the TXOP.

Figure 6:
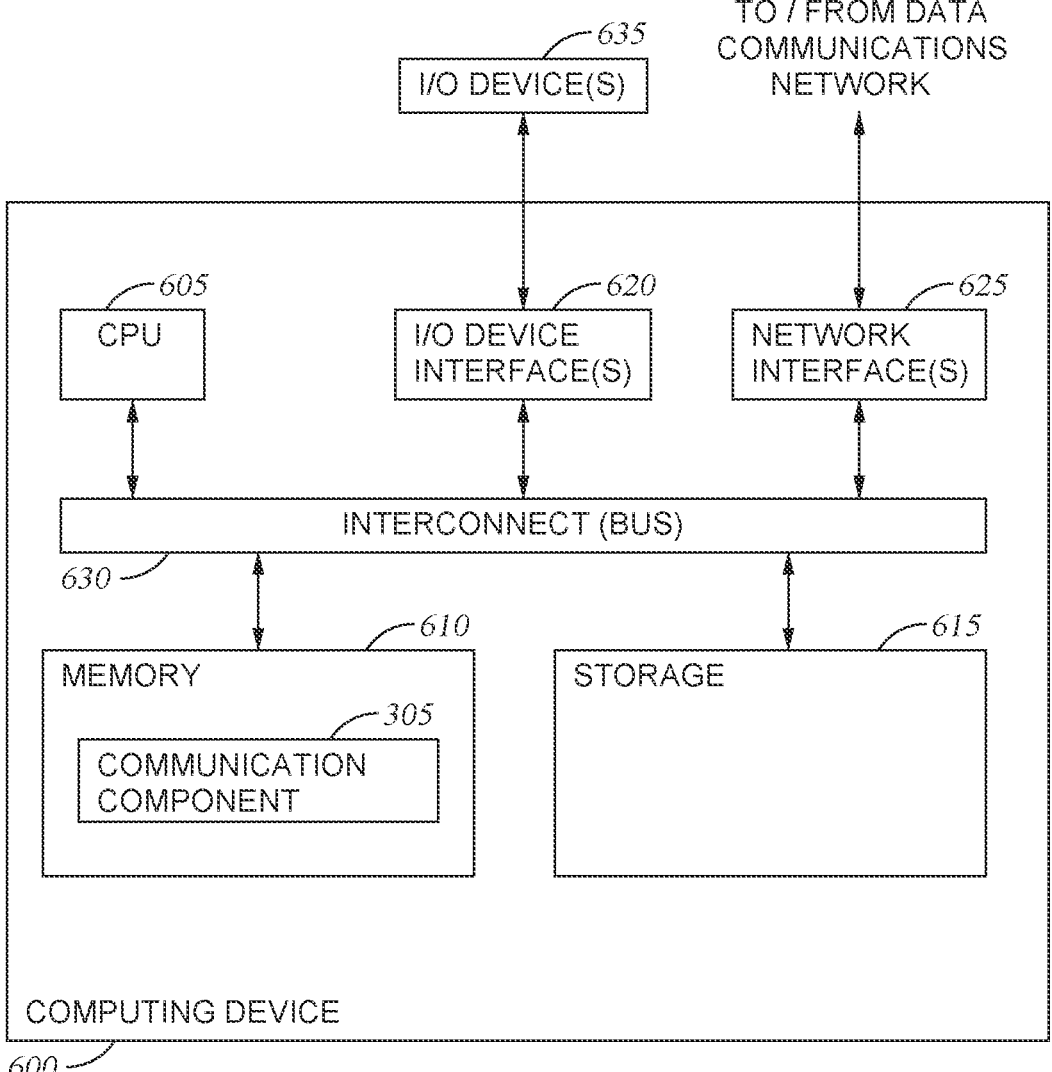
FIG. 6 depicts an example computing device configured to perform various aspects of the present disclosure, according to some embodiments of the present disclosure.

FIG. 6 depicts an example computing device 600 configured to perform various aspects of the present disclosure, according to some embodiments of the present disclosure. Although depicted as a physical device, in embodiments, the computing device 600 may be implemented using virtual device(s), and/or across a number of devices (e.g., in a cloud environment). In one embodiment, the computing device 600 corresponds to a peer-to-peer device, such as a peer-to-peer device 115 of FIG. 1. In another embodiment, the computing device 600 corresponds to an AP, e.g., AP 110 or AP 120.

As illustrated, the computing device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes a peer-to-peer communication component 650, which may perform one or more embodiments discussed above. Although depicted as a discrete component for conceptual clarity, in embodiments, the operations of the depicted component (and others not illustrated) may be combined or distributed across any number of components. Further, although depicted as software residing in memory 610, in embodiments, the operations of the depicted component (and others not illustrated) may be implemented using hardware, software, or a combination of hardware and software.

In one embodiment, the peer-to-peer communication component 650 may be used to facilitate peer-to-peer communication, as discussed above. For example, the communication component 650 may determine the availability of peer-to-peer devices for peer-to-peer communication, send trigger frames handing over a TXOP to peer-to-peer devices, send and/or receive peer-to-peer data, send and/or receive acknowledgement frames, or the like.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

determining, at a wireless access point (AP), that a first peer-to-peer device is available to receive one or more data packets directly from a second peer-to-peer device;

scheduling, by the AP, a peer-to-peer communication opportunity between the first peer-to-peer device and the second peer-to-peer device based on the determining, wherein at least one of the first and second peer-to-peer devices comprises an enhanced multi-link single radio (EMLSR) device; and transmitting, by the wireless AP, a first trigger frame to the first peer-to-peer device and the second peer-to-peer device based on the scheduling, wherein:

the first trigger frame indicates a link for the peer-to-peer communication opportunity and a beginning of the peer-to-peer communication opportunity, at least one of the first peer-to-peer device or the second peer-to-peer device transmit a confirmation frame to the wireless AP in response to the first trigger frame, and the second peer-to-peer device transmits the one or more data packets directly to the first peer-to-peer device in response to the first trigger frame.

2. The method of claim 1, further comprising:

receiving a first confirmation frame from the first peer-to-peer device;

receiving a second confirmation frame from the second peer-to-peer device; and in response to receiving the first and second confirmation frames, transmitting a second trigger frame to the second peer-to-peer device, wherein the second peer-to-peer device transmits the one or more data packets to the first peer-to-peer device further in response to the second trigger frame.

3. The method of claim 1, wherein:

the second peer-to-peer device is associated to the wireless AP, the first peer-to-peer device is not associated to the wireless AP, and transmitting the first trigger frame to the first peer-to-peer device comprises using a temporary peer-to-peer association identifier.

4. The method of claim 3, wherein:

the temporary peer-to-peer association identifier was transmitted, by the wireless AP, to the second peer-to-peer device, and the second peer-to-peer device forwarded the temporary peer-to-peer association identifier to the first peer-to-peer device.

5. The method of claim 1, wherein the first trigger frame transmitted to the first peer-to-peer device and the second peer-to-peer device comprises:

an assignment of a first subchannel for the first peer-to-peer device, and an assignment of a second subchannel for the second peer-to-peer device.

6. The method of claim 5, wherein:

the first peer-to-peer device transmits a first confirmation frame to the wireless AP using the first subchannel, and the second peer-to-peer device transmits a second confirmation frame to the wireless AP using the second subchannel.

7. The method of claim 6, wherein:

the second peer-to-peer device detects energy on the first subchannel when the first peer-to-peer device transmits the first confirmation frame, and the second peer-to-peer device transmits the one or more data packets to the first peer-to-peer device further in response to detecting the energy on the first subchannel.

8. The method of claim 1, wherein determining, at the wireless AP, that the first peer-to-peer device is available to receive one or more data packets directly from the second peer-to-peer device comprises at least one of:

(i) determining whether the first peer-to-peer device is participating in peer-to-peer communication with one or more other peer-to-peer devices;

(ii) determining whether the first peer-to-peer device is participating in communication with the wireless AP; or determining whether a radio of the first peer-to-peer device is available for peer-to-peer communication.

9. A non-transitory computer-readable medium containing computer program code that, when executed by operation of one or more computer processors, performs an operation comprising:

determining, at a wireless access point (AP), that a first multilink peer-to-peer device is available to receive one or more data packets directly from a second multilink peer-to-peer device;

scheduling, by the AP, a peer-to-peer communication opportunity between the first peer-to-peer device and the second peer-to-peer device based on the determining; and transmitting, by the wireless AP, a first trigger frame to the first peer-to-peer device and the second peer-to-peer device based on the scheduling, wherein:

the first trigger frame indicates a link for the peer-to-peer communication opportunity and a beginning of the peer-to-peer communication opportunity, at least one of the first peer-to-peer device or the second peer-to-peer device transmit a confirmation frame to the wireless AP in response to the first trigger frame, and the second peer-to-peer device transmits the one or more data packets directly to the first peer-to-peer device in response to the first trigger frame.

10. The non-transitory computer-readable medium of claim 9, the operation further comprising:

receiving a first confirmation frame from the first peer-to-peer device;

receiving a second confirmation frame from the second peer-to-peer device; and in response to receiving the first and second confirmation frames, transmitting a second trigger frame to the second peer-to-peer device, wherein the second peer-to-peer device transmits the one or more data packets to the first peer-to-peer device further in response to the second trigger frame.

11. The non-transitory computer-readable medium of claim 9, wherein:

the second peer-to-peer device is associated to the wireless AP, the first peer-to-peer device is not associated to the wireless AP, and transmitting the first trigger frame to the first peer-to-peer device comprises using a temporary peer-to-peer association identifier.

12. The non-transitory computer-readable medium of claim 9, wherein the first trigger frame transmitted to the first peer-to-peer device and the second peer-to-peer device comprises:

an assignment of a first subchannel for the first peer-to-peer device, and an assignment of a second subchannel for the second peer-to-peer device.

13. The non-transitory computer-readable medium of claim 12, wherein:

the first peer-to-peer device transmits a first confirmation frame to the wireless AP using the first subchannel, and the second peer-to-peer device transmits a second confirmation frame to the wireless AP using the second subchannel.

14. The non-transitory computer-readable medium of claim 9, wherein determining, at the wireless AP, that the first peer-to-peer device is available to receive one or more data packets directly from the second peer-to-peer device comprises at least one of:

(i) determining whether the first peer-to-peer device is participating in peer-to-peer communication with one or more other peer-to-peer devices;

(ii) determining whether the first peer-to-peer device is participating in communication with the wireless AP; or (iii) determining whether a radio of the first peer-to-peer device is available for peer-to-peer communication.

15. A system, comprising:

one or more computer processors; and a memory containing a program which when executed by the one or more computer processors performs an operation, the operation comprising:

determining, at a wireless access point (AP), that a first multilink peer-to-peer device is available to receive one or more data packets from a second multilink peer-to-peer device;

scheduling, by the AP, a peer-to-peer communication opportunity between the first peer-to-peer device and the second peer-to-peer device based on the determining; and transmitting, by the wireless AP, a first trigger frame to the first peer-to-peer device and the second peer-to-peer device based on the scheduling, wherein:

the first trigger frame indicates a link for the peer-to-peer communication opportunity and a beginning of the peer-to-peer communication opportunity, at least one of the first peer-to-peer device or the second peer-to-peer device transmit a confirmation frame to the wireless AP in response to the first trigger frame, and the second peer-to-peer device transmits one or more data packets directly to the first peer-to-peer device in response to the first trigger frame.

16. The system of claim 15, the operation further comprising:

receiving a first confirmation frame from the first peer-to-peer device;

receiving a second confirmation frame from the second peer-to-peer device; and in response to receiving the first and second confirmation frames, transmitting a second trigger frame to the second peer-to-peer device, wherein the second peer-to-peer device transmits the one or more data packets to the first peer-to-peer device further in response to the second trigger frame.

17. The system of claim 15, wherein:

the second peer-to-peer device is associated to the wireless AP, the first peer-to-peer device is not associated to the wireless AP, and transmitting the first trigger frame to the first peer-to-peer device comprises using a temporary peer-to-peer association identifier.

18. The system of claim 15, wherein the first trigger frame transmitted to the first peer-to-peer device and the second peer-to-peer device comprises:

an assignment of a first subchannel for the first peer-to-peer device, and an assignment of a second subchannel for the second peer-to-peer device.

19. The system of claim 18, wherein:

the first peer-to-peer device transmits a first confirmation frame to the wireless AP using the first subchannel, and the second peer-to-peer device transmits a second confirmation frame to the wireless AP using the second subchannel.

20. The system of claim 15, wherein determining, at the wireless AP, that the first peer-to-peer device is available to receive one or more data packets directly from the second peer-to-peer device comprises at least one of:

(i) determining whether the first peer-to-peer device is participating in peer-to-peer communication with one or more other peer-to-peer devices;

(ii) determining whether the first peer-to-peer device is participating in communication with the wireless AP; or (iii) determining whether a radio of the first peer-to-peer device is available for peer-to-peer communication.

*    *    *    *    *